United States Patent Office 3,676,203
Patented July 11, 1972

3,676,203
SEMIPERMEABLE MEMBRANES
Samuel B. Sachs, Rehovot, Israel, and Robert L. Riley, San Diego, Calif., assignors to the United States of America as represented by the Secretary of the Interior
No Drawing. Filed Aug. 7, 1970, Ser. No. 62,177
Int. Cl. B32b 27/06
U.S. Cl. 117—123 D
3 Claims

ABSTRACT OF THE DISCLOSURE

Semipermeable composite membranes are prepared by coating polyacrylic acid on a porous support. The resulting membranes exhibit superior salt rejecting capability and find particular utility in desalination of water by reverse osmosis.

---

Reverse osmosis has attracted considerable interest in the field of purification of saline water. In this process, a pressure in excess of the osmotic pressure of the saline water feed solution is applied to the solution separated from purified water by semipermeable membrane. Pure water is thereby caused to diffuse through the membrane, while the salt molecules or other impurities are retained by the membrane.

Efficiency of the reverse osmosis process depends to a large extent on the nature of the membrane and numerous types of membranes and methods of preparing them have been described in the prior art, e.g., in U.S. Pats. 3,133,-132; 3,344,214; 3,412,184 and 3,430,074. These membranes are commonly cast from a solution of the membrane material in water or an organic solvent, with or without additional solution components such as swelling agents, etc. The membranes may be employed in the reverse osmosis process in the form of a free film or a film deposited on a porous support material.

In general, the operating effectiveness of a semipermeable membrane or composite is defined in terms of the percent rejection by the membrane of a nonpermeating component of the feed mixture and the rate of flow of the permeating component through the membrane. For example, if the feed mixture consists of an aqueous 1% sodium chloride solution and the permeating liquid has a sodium chloride content of 0.02% the membrane would be said to exhibit a 98% rejection of sodium chloride. The flow rate for commercial purposes is defined as gallons per square foot per day at a certain pressure; however, for experimental purposes a "membrane constant" is usually measured in terms of grams of permeated liquid per square centimeter of membrane surface per second of operation and per atmosphere of net pressure (applied pressure minus osmotic pressure).

It has now been found, in accordance with the present invention, that a composite membrane having superior separation characteristics may be prepared by forming a coating of polyacrylic acid (PAA) on a porous support.

The support is preferably as porous as possible consistent with its primary function of supporting the PAA film in an environment where sizeable pressure differentials will exist. Generally, the support should not contain surface pores greater in diameter than the thickness of the PAA membrane. Pore size will generally range from about 100 to 5000 A. Void volume, i.e., the percentage of unoccupied space within a unit volume of the support, will generally range from about 40 to 80 percent. Suitable support materials include porous glass, sintered metals, ceramics, etc.

Preferred support materials are, however, organic polymeric materials such as homopolymers or mixed polymers of cellulose acetate, polysulfone, cellulose butyrate, cellulose nitrate, styrene, vinyl butyral, etc. A particularly preferred support material is a mixed polymer of cellulose nitrate (35 second viscosity) and cellulose acetate (40 second viscosity), hereinafter referred to as CN-CA, containing about 38.3 percent of the acetate. These support materials are conventional in the reverse osmosis art and are readily prepared by casting from a solution comprising a good solvent for the polymeric material, plus a poor or nonsolvent therefor. For example, if the polymeric material is CN-CA, it may be dissolved in acetone in an amount of about 14 wt. percent, and about 50 wt. percent of a poor solvent, such as water, glycerin, ethyl or butyl alcohol or mixtures thereof, is then added to this solution. A layer of the desired thickness is then cast from the combined mixture, as by coating a glass plate having side runners. The cast CN-CA layer is then allowed to dry, preferably under conditions which retain the nonsolvent within the cast layer while the initial evaporation of the good solvent is accomplished. For example, if the nonsolvent is water the drying is carried out in a high humidity atmosphere. For this purpose the good solvent should have a higher vapor pressure than the nonsolvent so that its evaporation will take place first.

When support materials in the form of porous glass, sintered metals or ceramics are employed they may be used in thicknesses in the neighborhood of 100 to 200 microns. When polymeric organic materials are employed they are generally employed in the range of 10 to 150 microns in thickness, with membrane constants of about 1000 to $1,000 \times 10^{-5}$ g./cm.$^2$-sec.-atm. Although the thickness may of course vary depending primarily upon the structural characteristics of the particular polymeric material, such a material is often used having a thickness between about 50 to 60 microns. There are also suitable commercially available substances which may be used as the porous support substrate. For example, porous polymeric substances such as Millipore filters may be employed, particularly types VS and VM which are available in mean pore sizes of 250 A. and 500 A., respectively. These Millipore filters are made from a mixture of cellulose acetate and cellulose nitrate. There are also commercially available filters made from cellulose triacetate having suitable pore size.

Coating of the support with PAA is conveniently and efficiently accomplished by casting an aqueous solution of the PAA on the porous support. If the porous support is a flexible material, such as the above-discussed organic polymeric materials, it will usually be necessary to provide a backing material such as a glass plate for support of the polymeric material during casting. Casting procedures are conventional and typically involve application of the casting solution to the support surface by means of a doctor blade. Room temperature is usually satisfactory and preferred for casting, but temperatures may range from about 5 to 80° C.

The casting solution consists essentially of an aqueous solution of PAA, the concentration of the PAA being about 5 to 40 wt. percent. The average molecular weight of the PAA may vary from about 50,000 to 1.5 million, with a range of about 300,000 to 1.5 million being preferred. Optimum molecular weight will, however, depend on a number of factors such as the nature of the porous support, the type of desalination apparatus in which the membrane composite is to be used, type and concentration of salts to be removed from the feed, etc., and is best determined experimentally. The wet thickness of the cast PAA coating will usually range from about 5 to 500 microns. Again, however, optimum wet thickness, and the resulting dry thickness of the finished PAA film, will depend on the above factors and is best determined experimentally.

Following casting, the coated support is air dried for about 5 to 48 hours at a temperature of about 25 to 80° C., room temperature usually giving good results. This results in removal of about 70 to 100 percent of the water and yields a continuous uniform coating of the PAA on the porous support. In addition, the resulting PAA film permeates the porous support to a degree sufficient to ensure a tightly adhering film, which can be removed only with difficulty.

An alternative means of coating the porous support with the PAA consists of simply immersing the support in the solution of PAA for a period of about 15 seconds to several minutes, allowing the excess solution to drain off and then air-drying as above. Annealing in air at a temperature of about 80 to 130° C. may also be beneficial. Concentrations and molecular weight of the PAA, temperatures, etc., are generally the same as those employed in casting, although optimum conditions for the two processes may differ somewhat. In general, longer immersion times and heating in air tend to reduce water flow, decreased water flow in turn tending to cause increased rejection. Dip-coating has generally been found to give results comparable to casting.

A still further means of coating the porous support with PAA consists of spraying a solution of the PAA on the support, followed by air-drying. The PAA layer is conveniently applied to the porous membrane surface from an aqueous solution by means of an airless spray gun. The thickness of the PAA film can be controlled by varying the concentration of the solution and the length of spray time. Again, concentrations and the molecular weight of the PAA, temperatures, etc., are generally the same as those employed in casting or dipping.

The desalination devices in which the composite membranes of the invention are typically employed are conventional and will not be described in detail in this application. In general, however, such devices include mounting means for positioning the membrane so that a supply of feed solution at the desired pressure can be fed to the surface of the membrane on which the PAA film is located. The devices also include systems for removing the fluid which permeates through the opposite surface of the composite and a system for removing the feed mixture which has been depleted of the fluid component. The flow rate of the feed mixture to the device and withdrawal of the depleted mixture are regulated to maintain the desired feed pressure while keeping the boundary layer effect at the surface of the membrane below the desired limit.

The following example will serve to more particularly illustrate the invention.

EXAMPLE 1

A finely porous support membrane was prepared by casting a solution of cellulose nitrate (CN) and cellulose acetate (CA). The casting solution consisted of 86 percent CN (35 second viscosity) and 14 percent CA (40 second viscosity) in a solvent system consisting of 59.1 percent acetone, 21.8 percent ethanol, 14.7 percent n-butanol, 1.7 percent water, 2.2 percent glycerin and 0.5 percent Triton X–100 (octyl phenol polyester alcohol nonionic surfactant). Before use, the solution was pressure filtered through a 10-micron polypropylene filter at about 100 p.s.i.

The solution was continuously cast with a knife onto glass plates (1 by 4 ft.) which were then carried through a gelation chamber on a paper belt. Moist air was circulated over the surface of the membrane through a series of small chambers that served as plenums. The air flow was directed down onto the surface through an impregnated Dacron Reemay cloth and a perforated metal sheet in series, which served to distribute the flow. The air stream was first saturated with water by passage through a stainless steel sparging column consisting of a short packed section with water reflux followed by a demister section. The humidifier was maintained in a temperature-controlled water bath. The manifold and distributors leading the air to the membrane were so constructed that entrained droplets of water were not discharged onto the curing film.

The table top supporting the belt consisted of two sections of aluminum plate (6-ft. and 4-ft. long, respectively) that were heated independently by water circulating through copper coils attached to the bottom of the plates. The membrane was cast under standard conditions of 38° C. gelling-plate temperature and 25° C. humidifier temperature. Residual solvents were removed from the cured membrane by passing it over the second aluminum plate held at 45° C. The casting speed was 3 in./min.; at this speed, the gelation period was long enough that the membrane was cured to a white opaque appearance when it left the gelation plate.

The resulting support membrane had a thickness of 110 microns, a bulk porosity of 80% and a membrane constant of $5000 \times 10^{-5}$ g./cm.$^2$-sec.-atm.

A PAA film was then cast on the support membrane with a film-casting knife from a casting solution consisting of a 25 weight percent solution of PAA in water. The PAA had an average molecular weight of 300,000. The cast film, which had a wet thickness of 250 microns, was allowed to dry under ambient conditions for 1 day, after which it had a dry thickness of 40 microns and was ready for use. The PAA adhered tightly to the porous support and could be removed only with difficulty.

The membrane was then placed in a high pressure reverse osmosis test cell. Flow through the composite membrane at 25° C. was initially >40 gal./ft.$^2$-day at 100 atm. applied pressure, with 83% rejection of 1% NaCl. After 15 hours the water flow essentially stabilized at ~20 gal./ft.$^2$-day and the rejection of 1% NaCl stabilized at 86%. The rejection was found to depend on pH and was a maximum at pH 7–9. The rejection of $Na_2SO_4$ was even better that that of NaCl, reaching >95% with a 1% solution of $Na_2SO_4$ at 100 atm. applied pressure and pH 7 and with a water flow of ~20 gal./ft.$^2$-day. The rejection of a 1% solution of $CaCl_2$ was 74% under the same conditions at pH 7.

EXAMPLE 2

In this example the CN–CA support membrane of Example 1 was coated by dipping, rather than casting. The dull side of the support was masked by tapping to a Teflon (polytetrafluoroethylene) coated glass plate for the dipping operation. The concentration of the PAA solution was 2.5 weight percent and the time of immersion was 30 seconds. The coated support was air dried for a period of 24 hours and was then annealed in air at 110° C. for a period of 1 hour.

The composite membrane was then tested as above (Example 1). Flow through the composite membrane at 25° C. was initially 10 gal./ft.$^2$-day at 100 atm. applied pressure, with 93% rejection of 1% NaCl. After 48 hours the water flow stabilized at 18 gal./ft.$^2$-day and the rejection of 1% NaCl at 88%. As is apparent, performance of the membranes prepared by dip-coating was similar to those prepared by casting.

What is claimed is:

1. A semipermeable composite membrane consisting of a substantially continuous and uniform coating of polyacrylic acid of a thickness of about 5 to 60 microns on a porous support from the group consisting of porous glass, sintered metal, ceramic and a polymeric organic membrane, and having a pore size of about 100 to 5000 A., and a bulk porosity of about 40 to 80 percent.

2. The composite membrane of claim 1 in which the porous support is a polymeric organic membrane consisting of a mixture of cellulose nitrate and cellulose acetate.

3. The composite membrane of claim 1 in which the average molecular weight of the polyacrylic acid is from about 300,000 to 1 million.

References Cited
UNITED STATES PATENTS

| | | | |
|---|---|---|---|
| 2,876,205 | 3/1959 | Lighthipe et al. | 117—161 X |
| 3,000,758 | 9/1961 | Hennemann et al. | 117—161 X |
| 3,462,362 | 8/1969 | Kollsman | 210—321 X |
| 3,332,894 | 7/1967 | Cantor et al. | 210—23 X |
| 3,556,305 | 1/1971 | Shorr | 210—500 X |
| 3,556,992 | 1/1971 | Massucco | 210—500 X |
| 3,449,245 | 6/1969 | Johnson et al. | 210—23 |
| 3,476,581 | 11/1969 | Weitzel et al. | 117—161 X |
| 3,524,546 | 8/1970 | Hoehn et al. | 210—500 X |
| 3,520,960 | 7/1970 | Douglas | 210—500 X |

WILLIAM D. MARTIN, Primary Examiner

M. R. LUSIGNAN, Assistant Examiner

U.S. Cl. X.R.

117—124 E, 132 C, 138.8 A, 138.8 U, 145, 161 UZ; 210—500